United States Patent [19]

Foster

[11] Patent Number: 4,959,734

[45] Date of Patent: Sep. 25, 1990

[54] PRESTORED RESPONSE PROCESSING SYSTEM FOR BRANCHING CONTROL OF INTERACTIVE VIDEO DISC SYSTEMS

[75] Inventor: Richard W. Foster, Huntsville, Ala.

[73] Assignee: Interactive Video Disc Systems, Inc., Huntsville, Ala.

[21] Appl. No.: 294,767

[22] Filed: Jan. 6, 1989

Related U.S. Application Data

[63] Continuation of Ser. No. 30,453, Mar. 25, 1987, abandoned, which is a continuation of Ser. No. 692,654, Jan. 16, 1985, abandoned, which is a continuation-in-part of Ser. No. 311,939, Oct. 16, 1981, abandoned, which is a continuation of Ser. No. 29,282, Apr. 11, 1979, abandoned, which is a continuation-in-part of Ser. No. 18,583, Mar. 8, 1979, abandoned.

[51] Int. Cl.⁵ ............................................. H04N 5/76
[52] U.S. Cl. .................................. 358/341; 360/19.1;
  358/242; 434/318; 434/314
[58] Field of Search ............... 358/140, 342, 341, 343;
  360/14.1–14.3, 72.2, 77–78; 364/521; 365/214,
  234; 369/32, 33, 41, 43, 47–49; 434/314–323;
  273/DIG. 28

[56] References Cited

U.S. PATENT DOCUMENTS

| | | | |
|---|---|---|---|
| 3,905,128 | 9/1975 | Koizumi et al. | 434/321 |
| 3,996,671 | 12/1976 | Foster | 360/72.2 X |
| 4,305,131 | 12/1981 | Best | 434/323 X |
| 4,422,105 | 12/1983 | Rodesch et al. | 360/72.1 X |

OTHER PUBLICATIONS

"A Random Access System Adapted for the Optical Video Disc. Its Impact on Information Retrieval"; Mathieu, SMPT & Journal, Feb. 77, vol. 86, pp. 80–83.

Primary Examiner—Robert L. Richardson
Attorney, Agent, or Firm—C. A. Phillips

[57] ABSTRACT

An interactive control system including a wide bandwidth, random access recorder including a recording which contains sequentially recorded discete sets of co-located video, audio and digital information including, for example, a question or other interrogation signal, and wherein at an end of a set of such co-located recorded information there would be recorded a multiplicity of digital signals, each signal being comprised of an "answer" portion and a "second location" portion. Further, circuitry is provided to halt the playback of the recording when an input from the user is required for the purposes of testing, measuring or selecting and where the recording medium is halted before the location of the multiplicity of digital signal portions is reached. Further, circuitry is provided for a digital response to the interrogation signal to be obtained from a manual or automatic operation and placed in a "response" digital storage register. After this is done, circuitry is provided to restart the recording medium and to play the sequentially encoded digital signal "answer" and "second location" portions through a digital shift register where they are successively, at high speed, compared to the digital response previously stored in the "response" storage register.

8 Claims, 6 Drawing Sheets

PRESTORED RESPONSE PROCESSING SYSTEM FOR BRANCHING CONTROL OF INTERACTIVE VIDEO DISC SYSTEMS

This application is a continuation of application Ser. No. 07/030,453, filed Mar. 25, 1987, now abandoned, which was a continuation of application Ser. No. 06/692,654, filed Jan. 16, 1985, now abandoned, which was a continuation-in-part of application Ser. No. 06/311,939, filed Oct. 16, 1981, now abandoned, which was a continuation of application Ser. No. 06/029,282, filed Apr. 11, 1979, now abandoned, which was a continuation-in-part taken from the parent case, Ser. No. 06/018,583, filed Mar. 8, 1979, now abandoned.

BACKGROUND OF THE INVENTION

1. Field of the Invention

This invention relates to systems for the storage on and reproduction from a single recording track, and particularly to an automated system wherein the data is of a variety of types, video, audio, and digital, which is recallable as a function of correlation between recorded and external signals.

2. General Description of the Prior Art

In the fields of interactive instruction, information storage and retrieval and process measurement and control, recorded audio, visual and digital information is often required to be output at a discrete time, and that discrete time may be dependent upon the correlation between answers or some form of feedback, often in digital form, from an operator or process. In the case of instructional systems, depending upon the comparison, the operator or student would then be given certain other information; and, in the case of a process, the machine would be directed to, for example, repeat a measurement or go to a new measurement or control action, or, in both cases, to load a digital program into an external computer to carry out a more complex process or operation.

The approach to accomplishing this type of control that is conventionally used is to take all the recorded "answer" and "second-location" commands and to store them in an extensive and expensive computer memory which is controlled by a complex operating system and a program written in an application language. When the student or user input occurs, the application program, operating under the operating system, must search the memory for the matching stored "answer" and "second-location" command. This means, of course, that the range of responses is limited to the capability of the memory, that additional expense is incurred by storing the recorded messages twice, once in the recording medium and the second time in the expensive and complex computer memory, and the additional complexity, cost and unreliability of a computer and computer programming language must be borne by the user.

It is the objective of this invention to eliminate the need for extensive computer memory, to eliminate the need for a computer, to eliminate the need for an operating system and applications programming language, and to eliminate the redundant storage of "answers" and "second-location" type control information in interactive instruction, information storage and retrieval and process control systems containing random access video, audio and digital recording and playback equipment.

The invention is briefly summarized in the Abstract and the disclosure and is treated in somewhat greater detail in the description of FIGS. 1-5.

DETAILED DESCRIPTION OF THE DRAWINGS

The system of this invention employs a single track wide spectrum reproduction unit, and preferably a video disc-type unit capable of playback at least up through the conventional video range of 4 MHz, and preferably upward to 20 to 30 MHz. Such a latter capability has been demonstrated by the "Discovision" disc player developed by MCA, Torrence, Calif.

Figures 1, 4, 7A:
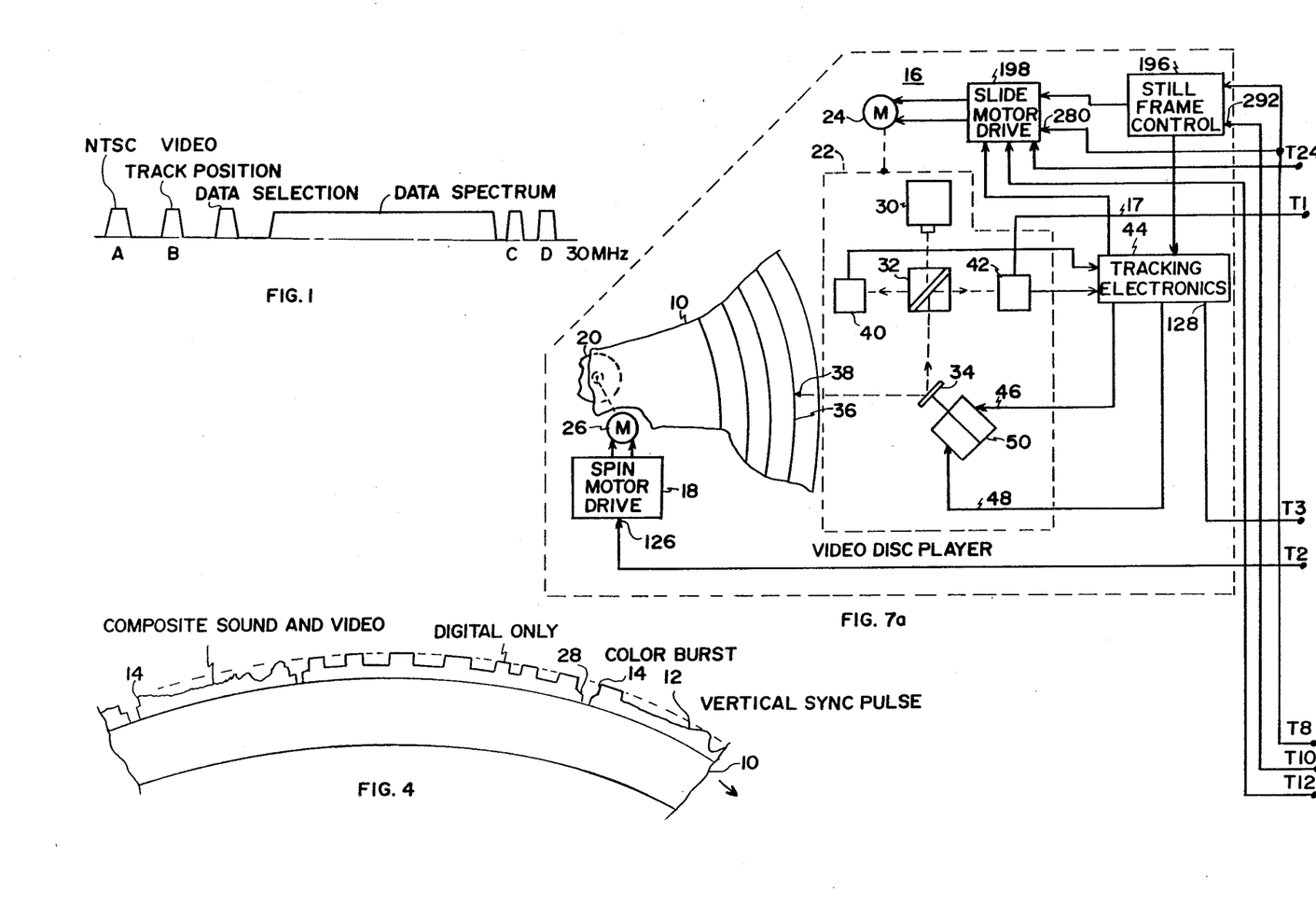
FIG. 1 is a diagram illustrating an example of spectrum usage as contemplated by this invention.
FIG. 4 is a graphical illustration of a recording of a color television signal.
FIGS. 7a–7c combine as a block diagram to illustrate in greater detail the system of this invention.

A previous proposal of usage for the "Discovision" system is for the recording and playback of combined picture and audio signals in a signal range of from 0 to 9.5 MHz. The present invention preferably contemplates that there be recorded on a disc of this system, or another, a plurality of channels, e.g., as shown in FIG. 1. The channels would include modulated subcarriers within a spectrum extending upward to near 30 MHz. In the example of FIG. 1, one of the subcarriers, indicated as subcarrier A, is a TV subcarrier made up in accordance with a proposed NTSC format. It is more particularly illustrated in FIGS. 2 and 3. Alternately, instead of the NTSC format, and as a feature of this invention, the brightness portion of the signal of the illustrated format may be digitally modulated, or modulated with compressed audio or facsimile signals. In either case, the subcarrier carries the sync signals conventionally employed to time the sweep of the electron beam of a TV monitor for each line and frame scan, and there are used to mark and thus count discrete frame and line prints or track positions along the recorded track. Pertinent to pure TV usage, a color frequency signal burst is provided to unravel compressed color information, and this is shown in FIG. 4. In all cases, the frequency content of a channel would be such as to not create harmonic or image responses which would interfere with data in other channels.

Figure 5:
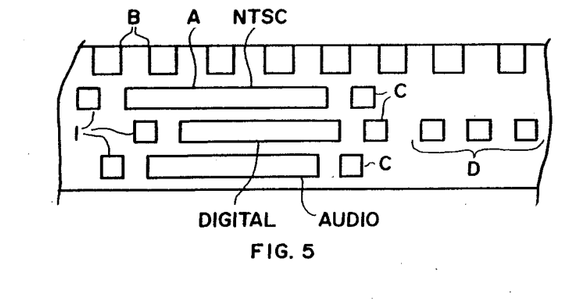
FIG. 5 is a schematic illustration of the recording of data as contemplated by this invention.

FIG. 5 illustrates an example of certain of the co-located data on a recorded track as contemplated by the invention. Thus, in addition to NTSC format signal A, other signals are shown. One of these, represented by subcarrier B, is digitally encoded with signals indicating the position along a track of subcarrier B, whereby the position of co-located data along the track may be located. This subcarrier is particularly employed where it is not desired to record or utilize track position information otherwise appearing on a TV subcarrier A. Preceding each of a particular sequence of data, illustrated as NTSC, audio, or digital in FIG. 5, there would appear a discrete subcarrier I encoded to identify the classification of data to follow, e.g., NTSC, audio, digital, or otherwise. Thus, such an identification encoded signal, upon being reproduced, would operate to direct the signal which followed to, as appropriate:

a reproducer or other utilization device for using data digitally encoded as information or interrogation signals;

a display for pictorial signals;

a reproducer of aural signals;

a reproducer of facsimile signals;

a signal responsive slide projector for reproducing selected slides;

an auxiliary digital device such as a digital register adapted to receive measurements or other value quantities; and a programmable computer programmed by data recorded on the recording medium.

Additionally, as illustrated in FIGS. 1–5, there would be recorded, as a subcarrier C, either at the beginning or end of a data sequence, signals indicating the position of the end of that data sequence. This would thus provide a termination signal for turning off a utilization or other device responsive to a particular data sequence. As still another set of recorded information, signals D would be recorded along the track, and these signals would provide "go to" track position commands when correlated with off-track generated signals, as will be further explained.

For example, with regard to the description to follow, we are particularly concerned with a digital signal co-located with a video signal and an audio signal as shown in FIG. 5 and specifically with a digital signal comprised of the discrete subcarrier I indicating that the digital information to follow is particularly to be routed to an auxiliary digital device such as a digital register adapted to receive measurements or other value quantities as listed above. The following digital data will, in subsequent discussion, be described to be the "answer portion" or "first portion," followed by the discrete subcarrier C indicating the end of that data sequence, followed finally by signal type D providing what will be referred to in subsequent discussion as the "second signal portion" or "second location" address of "go-to" address when correlated with externally generated or off-track generated signals as noted in the immediately preceding paragraph as, for example, where the signals are to be correlated or are identical.

It is contemplated that the method whereby a particular data sequence to be reproduced as sound, displayed, or otherwise presented would be based upon interaction between circuitry controlling the operation of the disc player and a signal generated by a person, as per a teaching device or information retrieval system, or by a signal derived from some detected physical condition, as, for example, the condition of a machine, as in the case of an industrial system.

In the first case, there would be a keyboard with electrically encoded outputs which would provide an input to a comparator, which input would be compared therein with a question from a discrete sequence of reproduced data, and, depending upon the answer supplied, the random access video disc player or random access tape unit would be directed to reproduce from some other preprogrammed portion of the disc. A detailed description of this process as exemplified by the disc approach is described with respect to FIGS. 5–7. In the case of checkout or process control systems, for example, the digital output from a disc would be received, and this output compared with an electrical representation of the state of a particular point in the system; and depending upon correlation, or lack of same, the player would be operated to proceed with selected additional tests, or to direct, via one of the subcarrier outputs, system adjustments.

Figure 2:
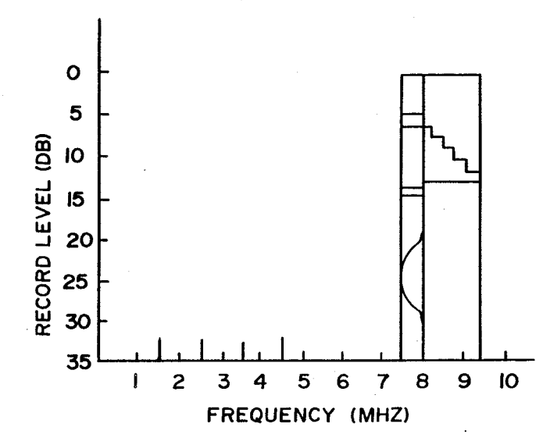
FIG. 2 is a diagram illustrating an example of spectrum usage on one of the subcarriers shown in FIG. 1.
Figure 3:
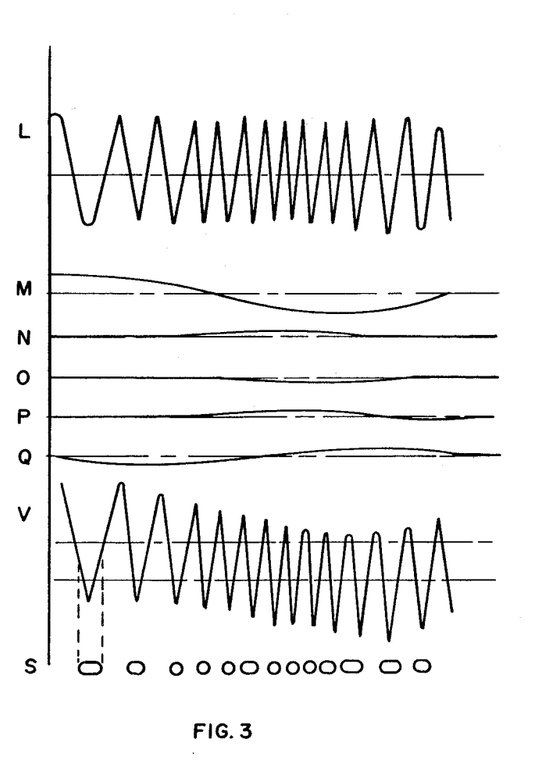
FIG. 3 is a diagram illustrating, as waveforms, modulation components shown in FIG. 2 and their resolution into an overall modulation pattern.

FIGS. 2 and 3 particularly illustrate a proposed arrangement of spectrum usage of the "Discovision" system for the reproduction of conventional TV signals, which in the example of FIG. 1, would be, as stated above, recorded in channel E. Thus, waveform L (FIG. 3) is representative of the picture brightness signal present in the form of an upper side band located at a sub-subcarrier position at 7.5 MHz (FIG. 3) with a bandwidth extending upward to approximately 9.5 MHz. Waveform M is representative of color information in the form of a 3.5 MHz signal transmitted in an FM lower side band with respect to a color carrier at 4.25 MHz. In this proposed format, there are four audio carriers, or sub-subcarrier channels, indicated "N", "O", "P", and "Q" centered about sub-subcarriers at 1.8 MHz, 2.3 MHz, 2.8 MHz, and 3.8 MHz. Waveform V (FIG. 3) illustrates the composite of waveforms L–Q, and when clipped at a selected amplitude as shown, a pulse width modulation signal is formed. This is then recorded on disc 10 (FIG. 7a) as a variable length pit illustrated by the line of pits "S" (FIG. 3).

In order to employ the "Discovision" unit as presently adopted, it is important that there be recorded on sub-subcarrier "L" information indicating the start of each frame and each line of each frame, this being normally accomplished from the presence of a vertical pulse 12 (for frame) and horizontal pulse 14 (for line) identification of pulses in the brightness signals as illustrated in FIG. 4. Further, there is required a speed reference signal, typically a 3.58 MHz signal appearing on sub-subcarrier L. If the illustrated proposed NTSC format is dispensed with, position and speed information would be encoded in another form and frequency than indicated. When this is done, modulated subcarriers may be positioned in any desired arrangement in place of carriers illustrated for subcarriers A–I (FIG. 1), and thus there would be produced a new resulting composite waveform V, and in turn a corresponding arrangement for the pit lengths of modulation S.

To prepare a disc for the MCA "Discovision" system, a light sensitive layer is exposed to a modulated laser beam. From this operation, there results the series of pits or depressions in a sensitized layer (illustrated in FIG. 3) lying in a continuous spiral track of 54,000 revolutions for 30 minutes playing time. The pits are of varying length as described above, and the lengths of the pits and distance between them contain all components of a coded information signal. This process of recording is referred to as a two-level process, which means that on the record, the repetition rate of frequencies is determined by the average length of the pits, and a pulse width modulation is determined by the modulation of the length of pits.

Referring to FIG. 7a, spin motor drive 18 of the "Discovision" player rotates turntable 20 at 1798.2 rpm on which is positioned one of the discs, disc 10. Optical reproducer 22 is radially driven by slide motor 24 to move the reproducer radially to effect approximate tracking of spiral track 36 during reproduction (precise tracking control is described below). Slide motor 24 also is operable rapidly to position reproducer 22 to a selected starting point on the track. The speed of disc 10 is sensed by a tachometer (not shown) coupled to turntable 20, and its output (electrical) is compared with the output of a 3.58 MHz crystal oscillator (not shown), whereby the speed of spin motor 26 is controlled within a close range. The final speed is controlled by a comparison of the oscillator frequency with 3.58 MHz subcarrier recorded on the disc. This frequency was chosen by the manufacturer of disc equipment to coincide with the 3.58 MHz colorburst signal (illustrated by a signal burst 28 of FIG. 4) transmitted during the back porch interval of each horizontal sync pulse.

Reproducer 22 includes a low powered laser 30 which provides a beam which is directed to beam splitter 32. A portion of the beam continues through beam splitter 32 and to mirror 34 where it is reflected onto a data track 36 of disc 10 in the form of a very fine read spot 38. A small portion of the laser beam is deflected by beam splitter 32 to photocell 40 which monitors the output of laser 30. The reflected read beam from disc 10 strikes mirror 34 and is reflected onto beam splitter 32 where it is deflected to pin photodiode 42. Electrical outputs of photocell 40 and pin diode 42 are fed to tracking electronics 44 where the output of photocell 40 provides displacement information of the read spot light beam in both radial (radially from the center of the track) and tangential (along the track) directions, and provides radial and tangential direction information controls 46 and 48 of mirror positioner 50 to compensate for any tracking error. Specifically, the correction of the tangential direction by tracking electronics 44 compensates for any time-base error occurring over the time interval of one revolution, and radial corrections by tracking electronics 44 provide fine radial adjustments to compensate for any eccentricity of the disc, thus keeping the read spot in the center of the data track. The output of photocell 40, indicative of the output of laser 30, enables the tracking electronics to ignore variations present in the read signal which are simply a function of variation in the output of laser 30.

Figure 6:
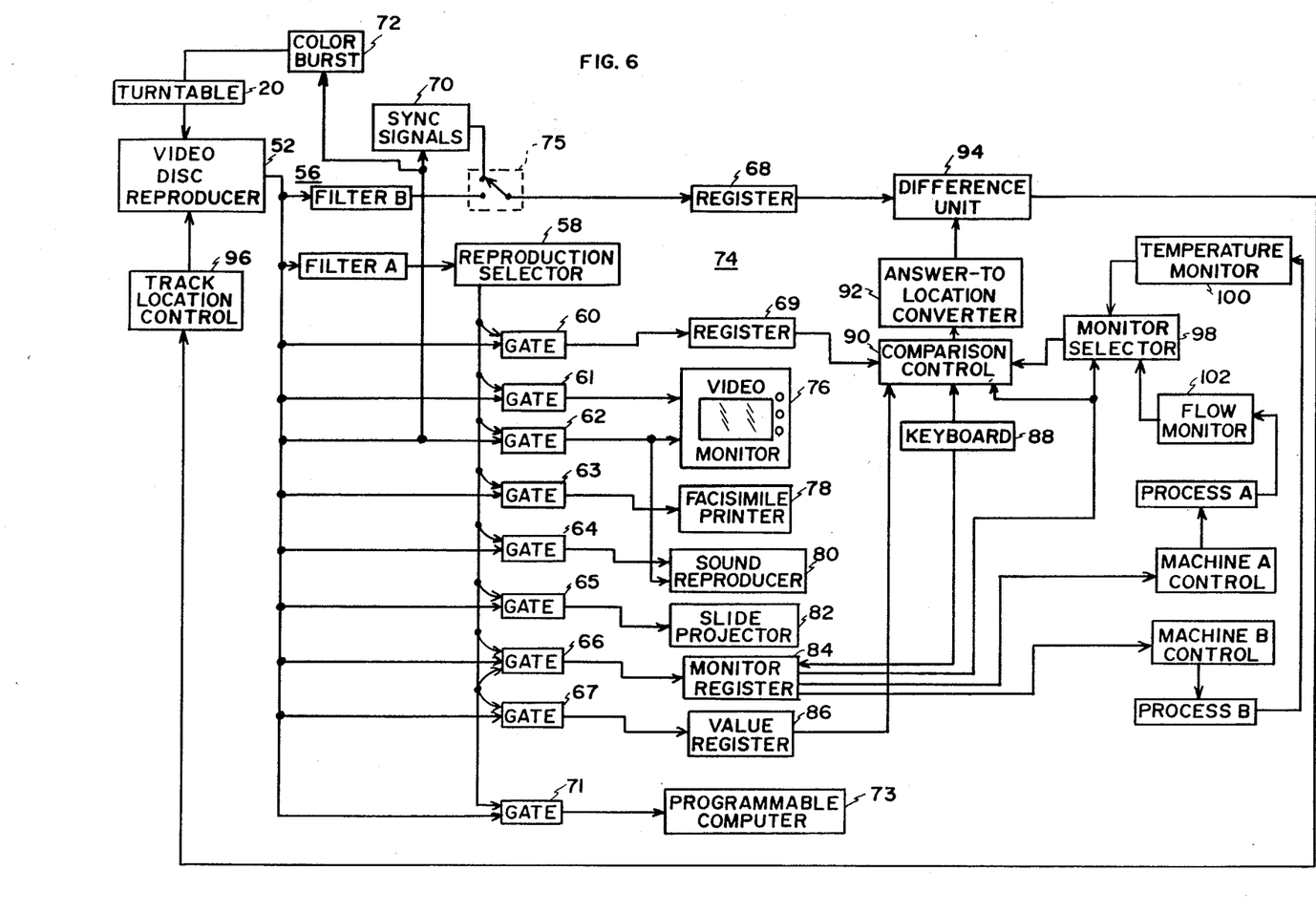
FIG. 6 is a block diagram generally illustrating the system of this invention.

Referring now to FIG. 6, and generally illustrating the system of this invention, certain outputs from the video disc being reproduced by video disc reproducer 52 are fed through a selected filter A or B of filters 56 and to gates 60–67 and 71. Filter B (if employed) would continuously provide a current track position, a digital signal via switch 75 to register 58 which maintains a continuously updated number indicative of the position along the track of the video disc which the reproducer has just passed. Alternately, where there is a television signal as per subcarrier A, the frame and line sync pulses would be counted (by means illustrated in FIG. 7b), and a number indicative of the frame and line would be applied to register 69. Additionally, this signal would provide a speed signal via colorburst detector 72 which would be fed back to turntable 20 of player 16.

Reproduction selector 58, responsive to a signal passed by filter A, identifying the type of data to follow, would provide a gating signal to the appropriate one of gates 60–67 to approximately gate data to the appropriate one of utilization circuits 74. As shown, these circuits consist of utility register 69, video monitor 76, facsimile printer 78, sound reproducer 80, slide projector 82, monitor selector 84, and value register 86. Slide projector 82 would include appropriate detection means to effect, responsive to an output signal from gate 65, the projection of a preselected sequence of slides stored in slide projector 82. Alternately, the signal gated by gate 65 would provide particular slide identification signals which would then cause slide projector 82 to select discrete slides and project them.

The system shown in FIG. 6 provides both for the output of data from a video disc to be selected as a result of a manual input provided by keyboard 88 or by an input from a measured condition or process or other appropriate devices. In the first case, data on the disc would, for example, provide an interrogation signal through gate 60 to register 69, and this signal, in the form of a number in register 69, would be supplied to comparison control 90. The operator would be called upon, as, for example, by a simultaneous question provided on video monitor 76, (or facsimile printer 78 or sound reproducer 80) to indicate an answer by operating keyboard 88 or other signalling device. The output of keyboard 88 would be provided as an input to comparison control 90 which, dependent upon a comparison with the digit in register 69, would provide a digital output to "answer-to-location" converter register 92, representative of the location of a desired preselected data group or other determined presentation recorded on video disc 10. This output, a number, would then be compared with the number in register 88 indicative of the present position of reproducer 52, and as a result, an output would be provided by difference unit 94 to track location control 96, which would then cause video disc reproducer 52 to go to the new location. Such described activity may arise from utilization of the system as an information retrieval system or teaching device wherein, in the latter case, preceding the interrogation, video disc 10 would have provided certain information or teaching via video monitor 76, facsimile printer 79, sound reproducer 80, or slide projector 82.

Alternately, when used as a process monitor, a signal would be provided through gate 66 to monitor selector register 84, which in turn would provide an input to monitor selector 98, which would enable machine B control of process B or machine A control of process A, or cause a measurement signal from, for example, temperature measurement monitor 100 or flow monitor 102 to be supplied to comparison control 90. Next, for example, a value signal would be supplied through gate 67 to value register 86, and therefrom to comparison control 90. This value would then be compared in comparison control 90 with the value supplied from temperature monitor 100 and, for example, if this were an acceptable value comparison, control 90 would provide an output answer to "answer-to-location" converter 92 which would provide a location command to difference unit 94 to cause track location control 96 to move video disc reproducer 52 to provide a next desired output from video disc 10. This, for example, might provide a signal through gate 66 to cause monitor register 84 to supply a selection signal to monitor selector 98 to gate through a pertinent measurement signal from flow monitor 102 to comparison control 90. This would be followed by a signal through gate 67 to value register 86 to provide a reference flow value signal to comparison control 90 which, depending upon its correlation with the output from flow monitor 102, would provide an answer to comparator 90 to cause video disc reproducer 52 to reproduce some further or previous point on a track on video disc 10.

Further, for example, a series of measurements of an industrial system or process might be made and compared, and in the event of a particular situation requiring a decision by an operator, such could be provided from a preprogrammed sequence of data on video disc 10 which would be displayed on video monitor 76, given as an audible instruction on sound reproducer 80, or written by facsimile printer 78. Still alternately, a digital-to-video type data converter may provide an output from a selected digital register in alpha-numeric form to video monitor 76 and the information thus written on the display of video monitor 76.

As a further feature of the system, data selected from the recorded medium, either by virtue of a student's response or a response from an industrial process, may be a computer program which would, responsive to an appropriate gating signal applied to gate 71, be applied to programmable computer 73. In such event, the measured variable (from student or process) may effect the selection of a program with a measured variable. The important significance of this is that you would load into the computer only what you need in it and when you need it. This is in contrast to the employment of a computer wherein all programs must be loaded into the memory of a computer on a full-time basis, and this is expensive.

Figure 7B:
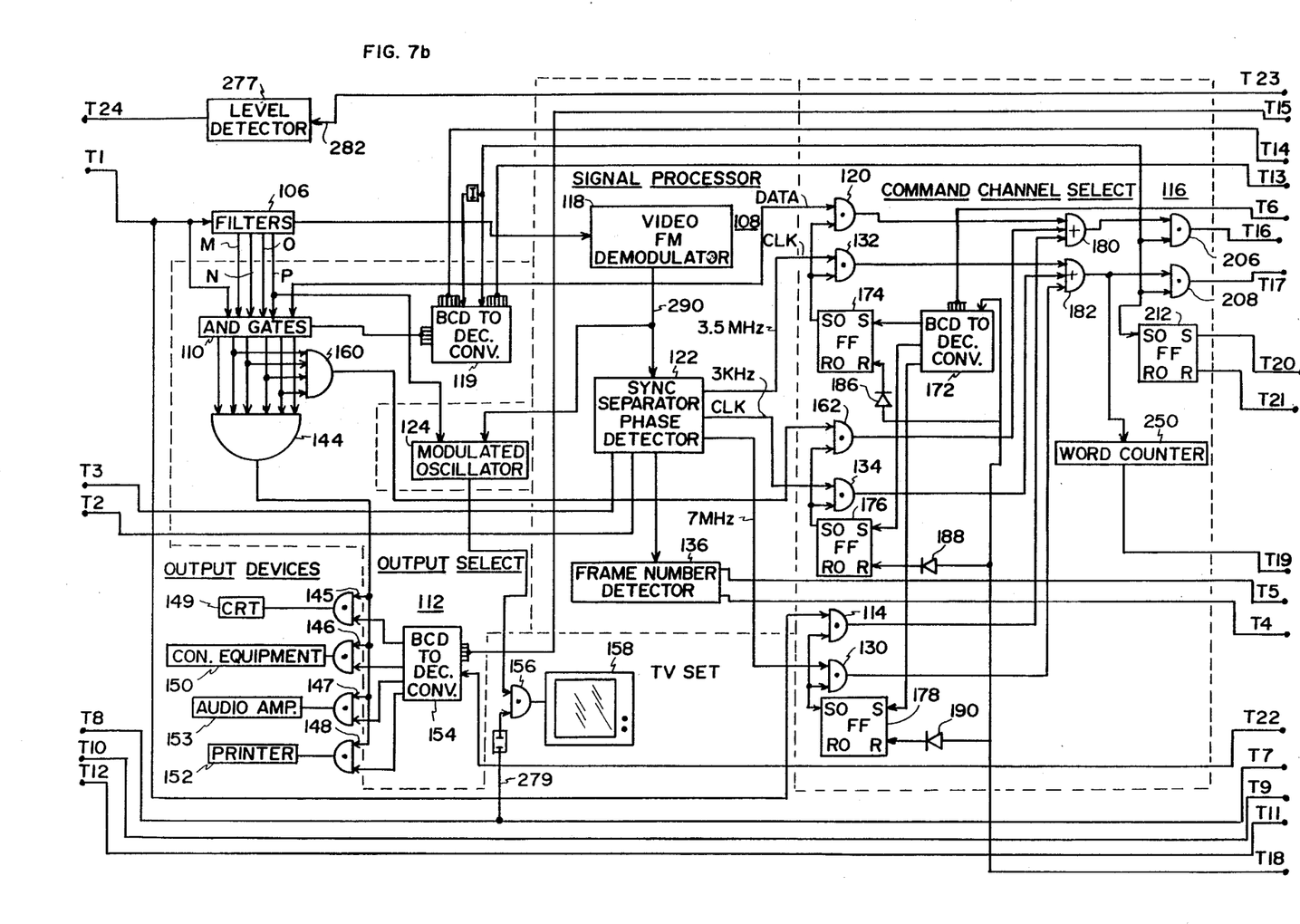
Figure 7C:
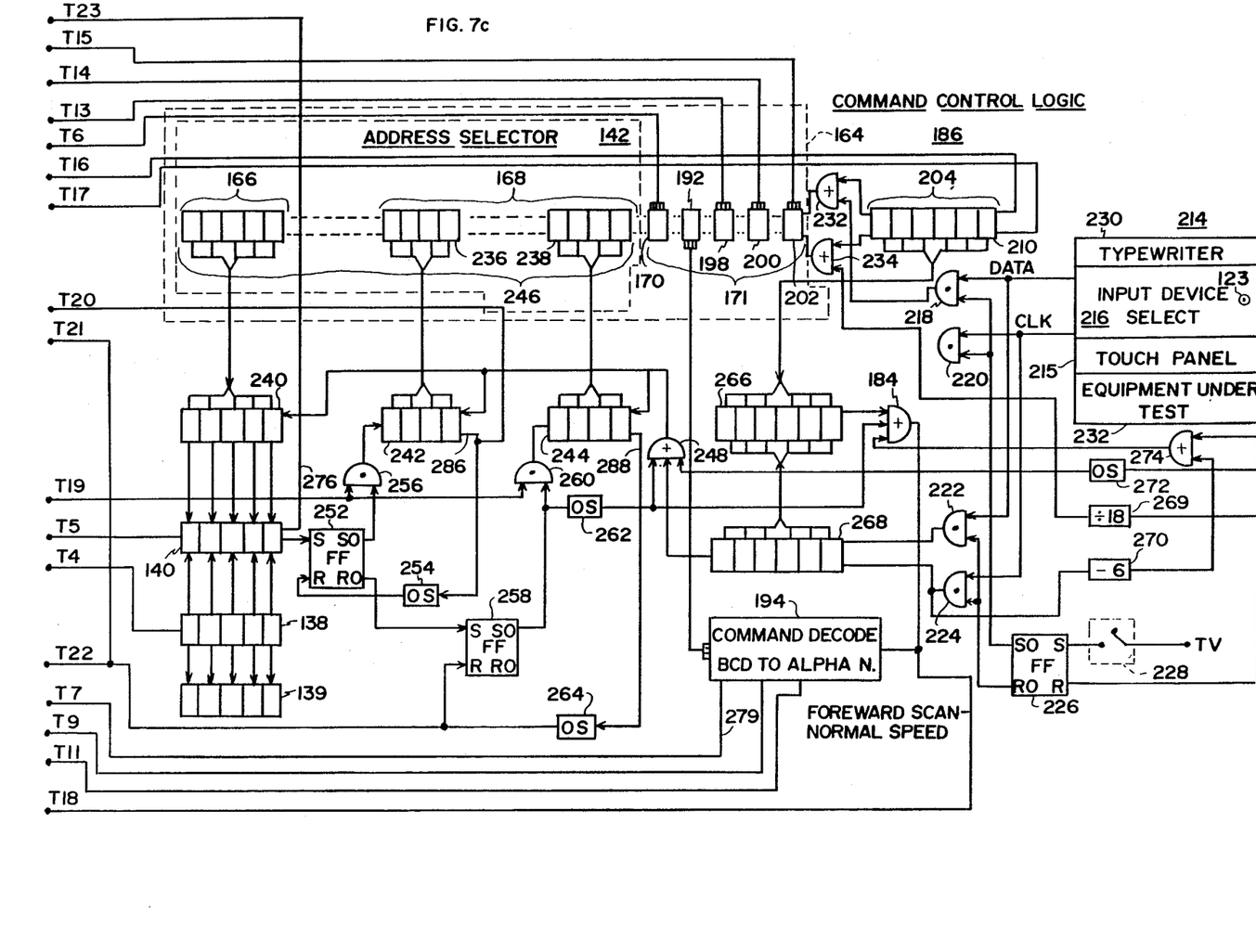
Figure 8:
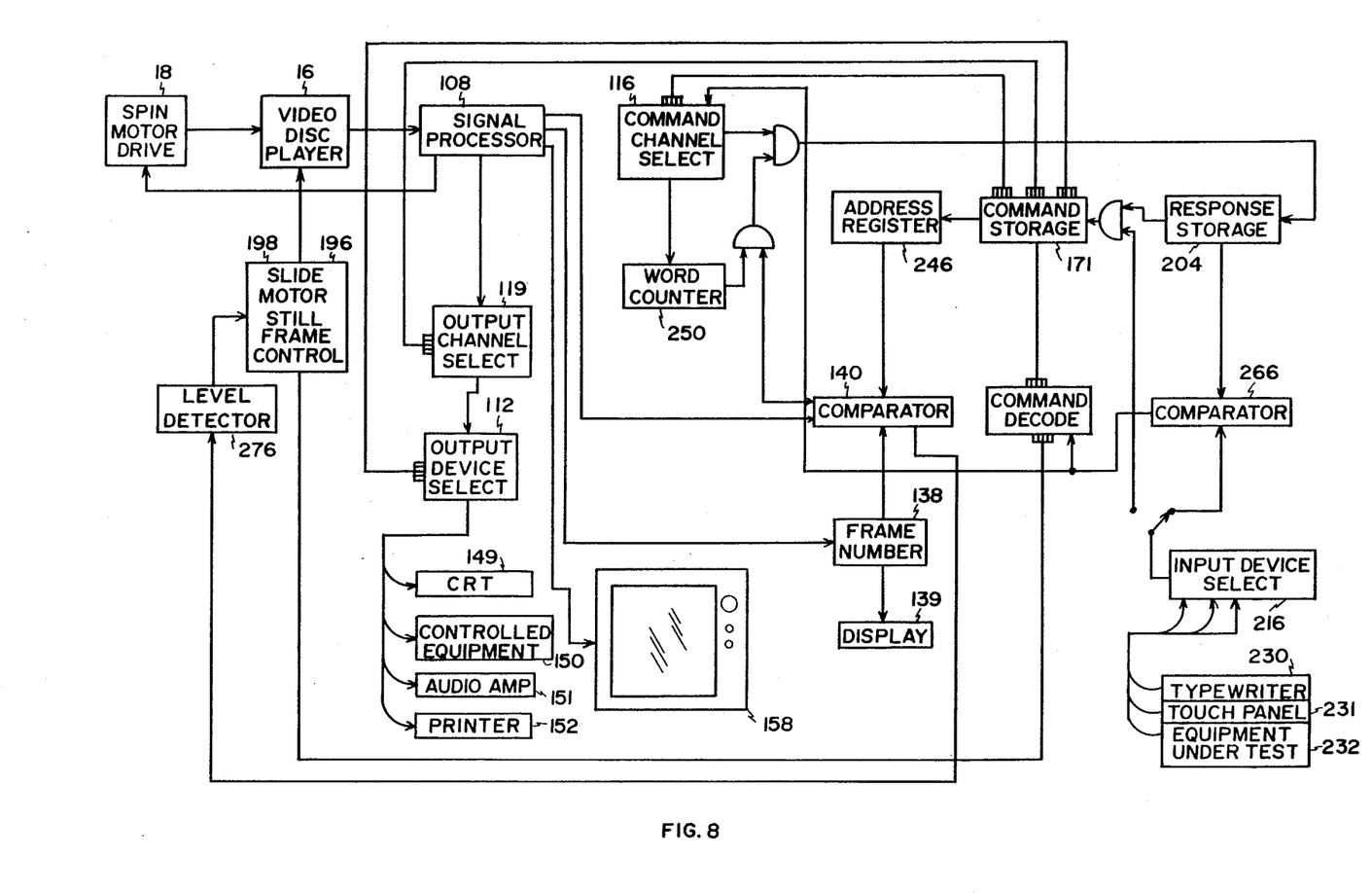
FIG. 8 is a block diagram broadly illustrating the system shown in FIGS. 7a–7c.

FIGS. 7a-7c together illustrate in greater detail a modification of the system shown in FIG. 6. FIG. 8 broadly illustrates the system shown in FIGS. 7a-7c. In describing the modified system, common reference will be made to FIGS. 7a-7c and FIG. 8. FIGS. 7a-7c are interconnected through common terminals T1-T24.

Referring first to FIG. 7a, photodiode 42 of disc player 16 provides an output 17 which is supplied through common terminal T1 to band pass filters 106 of signal processor 108 (FIG. 7b). This signal is further fed as one input of AND gate 110 of "output select" 112 and as one input of AND gate 114 of "command channel select" 116. High pass filters 105 separate and demodulate the low frequency audio channels M, N, O, and P (FIG. 3) from the higher frequency signals of output 17. These remaining signals, which are NTSC video (FIG. 8L) and color subcarrier (FIG. 3M), are fed directly to the input of video FM demodulator 118 (FIG. 7b).

The video signal is demodulated and coupled to one input of AND gate 120 of command channel select 116, one input of AND gates 110 of output select 112 as an input to sync separator 122, and as an input to modulated oscillator 124 of signal processor 108. By means of sync separator 122, the video signal is processed so as to separate the TV sync signals from video information and colorburst (3.58 MHz subcarrier) from horizontal sync pulses.

The colorburst signal is phase detected and coupled through common terminal T2 to input 126 of spin motor drive 18 where it is used as a reference to maintain a precise speed of spin motor 25 (FIG. 7a), and thus provides an accurate time base for TV reproduction as previously described.

A second phase detected output of the colorburst from sync separator 122 is coupled through common terminal T3 as an input 128 of tracking electronics 44 of video disc player 16 (FIG. 7a).

Further, three clock rates are derived from the 3.58 MHz color subcarrier of sync separator 122. These are a 7.16 MHz clock, a 3.58 MHz clock, and a 3 KHz clock, which are coupled as one input of AND gates 130, 132, and 134, respectively, of command channel select 116.

And finally, a frame number which is produced during each vertical sync pulse interval is connected as an input to frame number detector 136. Thus, a frame number, in serial format, is fed through common terminal T4 to frame storage register 138, and a vertical gating pulse is fed through terminal T5 to comparator 140 of address selector 142.

Information from any audio channel M, N, O, and P, in addition to the 30 MHz output 17 of photodiode 42 and video at the output of video FM demodulator 118, is selectively gated by BCD to decimal converter 119. Any selected output of AND gate 110 is coupled by OR gate 144 as one input of AND gates 145-148. Accordingly, information from any selected chemical can be directed to any of output devices 153 by an output of BCD to decimal converter 154. Audio output P and video from FM demodulator 118 are fed as inputs to modulated oscillator 124, an output of which is coupled through AND gate 156 to TV set 156.

Encoded data from any audio channel, M, N, O, and P is also gated through AND gate 110 and OR gate 160 as an input to AND gate 162 of command channel select 116. Selection of pre-encoded data from disc 10 is accomplished by a command word which is stored in command register 164, in a manner to be described. Each command word includes an address consisting of a 5 BCD digit frame number, stored in the 5 most significant digit (M.S.D.) stages 166 of register 154.

The first and last word of any selected frame is then designated by the next eight significant portions 168 of register 164. Next, M.S.D. portion 170 is coupled through terminal T6 as an input of BCD to decimal converter 172 which selectively pulses the set input S of flip-flops 174, 176, and 178. The set output SO of one of selected flip-flops 174, 176, and 178 enables clock and data signals through AND gates 132 and 120, 134 and 162, or 130 and 114, respectively. As a result, a command word from the output of demodulator 118, one of audio channels M-P or 30 MHz channel 17, is fed to OR gates 180 and 182. A command digit is strobed into converter 172 by a signal from OR gate 184 of command control logic 164, in a manner to be described. Flip-flops 174, 176, and 178 are reset through diodes 186, 188, and 190 by a leading edge of the strobe pulse at the output of OR gate 184, which is interconnected through terminal T18.

The next most significant portion 192 of register 164 contains a alpha-numeric character which supplies instructions to command decode 194. These commands include "go-to" "forward-normal speed", and "stop" commands which position reproducer 24 of disc player 16 (FIG. 7a), in a manner to be further described. A "go-to" command signal is routed from command decode 194 through series connected terminals T7 and T8 as one input of still frame control 196 and one input of slide motor drive 198. A "stop" command is fed through serial terminals T8 and T10 as an input to still frame control 196. The "forward-normal speed" command is connected through serial terminals T11 and T12 as an input to slide motor drive 198.

Portion 198 of register 164 is coupled to BCD to decimal converter 119 through terminal T13 and selects a desired command channel.

Portion 200 selects a desired output channel and is connected through terminals T14 as one input of BCD to decimal converter 119.

Portion 202 determines a selected output device and is routed through terminals T15 as a second input of BCD to decimal converter 119.

For example, the last six positions (more may be required) 204 of register 164 are reserved for the answers to a question asked of a student, or in some instances, data stored for later comparison. Commands can be loaded into register 164 from two different sources. First, and as described above, command words are selectively gated through OR gates 180 and 182 from any channel and directed as data and clock inputs to AND gates 206 and 208, respectively. Henceforth, they are routed through terminals T16 and T17 into stage 210 of register 164 by the set output SO of flip-flop 212 at the beginning of the selected command. Secondly, a command word is entered in register 164 from one of input devices 214, which determines video player 16 begins to reproduce or retrieve information from disc 10. Data and clock signals from one of input devices 214 are selectively coupled by selector 216 to AND gates 218 and 220, respectively, and to AND gates 222 and 224, respectively. AND gates 218 and 220 are then enabled by the set output SO of flip-flop 226, the reset output RO of which is coupled to the enable inputs of AND gates 222 and 224. In order to load register 164 with the appropriate initial instructions to player 16, momentary switch 228 of command/control 186 is closed to change flip-flop 226 to a set state.

Information then entered, as by typewriter 230, for instance, passes through OR gates 232 and 234 in serial format and is thus loaded into the first 18 most significant stages of register 164. The address portions of register 164, which includes frame number 166, first word 236, and last word 238 designations, are connected in parallel to frame number buffer 240, first word buffer 242, and last word buffer 244, respectively. The contents of frame number buffer 240 is in turn connected in parallel to comparator 140. This address is compared with the output of frame number detector 136 of signal processor 108, which address is stored in buffer register 138. A second output of buffer register 138 is connected to frame number display 139. The entire address 245 is strobed into buffers 240, 242, and 244 by an output of OR gate 248 of command and control logic 186. Word buffers 242 and 244 are connected as down counters and are pulled by an output of word counter 250 through terminal T19 which receives an input from the output of OR/gate 182 of channel select 116. Once the count in first word buffer 242 reaches zero, which indicates the start of the first selected word, flip-flop 252 is reset by an output of one-shot 254, disabling AND gate 256 and applying a set pulse through terminal T20 to flip-flop 212. This action also triggers flip-flop 258 and enables AND gate 260, whereafter buffer 244 is counted down to zero, indicating the last word has been selected. One-shot 262 is triggered, and an output pulse from one-shot 264 resets flip-flop 258, and through terminal T21, resets flip-flop 212. A strobe is applied through terminal T22 to BCD to decimal converter 154. A trigger pulse is applied to OR gates 248 and 184.

An answer, which was stored in portion 204 of register 164, was connected in parallel as one input of comparator 266. Buffer register 268 receives the answer supplied by a student response typically entered from typewriter 230. Assuming a correct answer is entered by a student, an output of comparator 266 initiates another cycle as determined by previously recorded information on video disc 10 and as selected by a command word now loaded in register 164. Character counters 269 and 270 control information flow to command register 164 and comparator 266, respectively. One-shot 272 strobes a command while OR gate 274 initiates a new cycle of events to player 16. The search for a new location is controlled by comparator 140 of address selector 142, and coincidence of address is indicated by output 276, which is coupled through terminal T23 to level detector 277, having an output fed through terminal T24 to slide motor drive 198.

OPERATION

In order to illustrate the operation as an instructional machine, it is assumed that a selected video disc 10 has just been placed in player 16 and a particular TV lecture from disc 10 is to be presented to a student. In order to select the desired material, reproducer 22 must be guided to the correct frame and word of that frame as follows.

Momentary switch 228 of command/control 186 is closed so as to change flip-flop 226 to a set condition. The set output SO of flip-flop 226 enables AND gates 218 and 220. Input device selector 216 is set to connect typewriter 230. Data and clock signals are thus connected as inputs to OR gates 232 and 234, respectively, and a clock signal is further connected as an input to character counter 269. The desired address and command word is now entered through portion 202 of register 164 in a serial format from typewriter 230. Assuming the lecture begins at frame number 25,000 and at the first word in that frame, then the address would be 25,000-0000-0001.

The next BCD digit 170 of register 164 determines the source of the first information, for instance, NTSC video, one of audio channels M-P, or 30 MHz. If the data is recorded in the video channel, then a (1) (0001) command is entered in portion 170 and connected to BCD to decimal converter 172. A "go-to" or (1000) "eight" is loaded into portion 192 which directs player 16 to search for and locate frame 25,000. The next portions 198, 200, and 202 of register 164 will contain (0000) zeroes since no output device other than the TV set is to be selected. No data is loaded into the answer portion 204 of register 164 since no answer is applicable at this time.

Upon entering the last character in stage 202 of register 164, a clock pulse triggers character counter 269 (which has now counted the 18 characters entered into command register 164), and one output of counter 269 triggers OR gate 274, an output of which triggers OR gate 184. A second output of counter 269 resets flip-flop 226 and triggers one-shot 272. An output of one-shot 272 then pulses OR gate 248, which action strobes the complete frame number and word number addresses into buffer registers 240, 242, and 244, respectively.

One output of OR gate 184 strobes the "go-to" or (1000) command just entered into portion 192 of register 164 into command decode 194. This BCD number is decoded and produces a decimal output 279 which is fed through terminals T7 and T8 to slide motor drive 198 and as an inhibit signal to AND gate 156 and one input of still frame control 196. A second output of OR gate 184 resets flip-flops 174, 176, and 178 of command channel select 116 and strobes the (0001) one command through terminal T6, previously loaded into portion 170 of register 164, into BCD to decimal converter 172. This action enables AND gates 120 and 132 via the set output of flip-flop 174, and thus selects data from the video channel at the output of FM demodulator 118. With a "go-to" command applied at input 280, slide motor drive 198 of video disc player 16 is enabled in a search mode of operation and searches at maximum speed and in a direction as determined by input 282 from level detector 277 through terminal T24.

At the beginning of each frame (also coinciding with the start of each rotation of disc 10), a frame number is transferred from frame number detector 136 of signal processor 108 to buffer register 138. This number is compared, by comparator 140, with the selected frame number which was previously strobed into register 240. As a result of this comparison, a voltage level is fed to input 282 of level detector 276, through terminal T23, which signifies whether the frame number from disc 10 is higher kor lower than the desired location. In this way, slide motor 24 is directed to search in the proper direction. At the end of each vertical blanking pulse, a frame number is loaded into comparator 140 by an output of frame number detector 136. When the desired frame is selected, an output 284 of comparator 140 triggers the set input S of flip-flop 252, changing it to a set state.

The set output SO enables AND gate 256, and a first pulse or count is thus fed to first word down counter 242 from word counter 250 through terminal T19. Since counter 242 contains all zeroes, a first pulse from word counter 250 produces an output 286 which sets flip-flop 212 through terminal T20, the set output SO of which enables AND gates 206 and 208 to permit data and clock pulses to be fed to the input of command register 164. Flip-flop 252 is also reset by an output of one-shot 254, and the reset output of flip-flop 252 sets flip-flop 258. At the end of one word time, register 164 is fully loaded, and the next count pulse from word counter 250 counts last word counter 244 down to zero, producing an output 288 which pulses one-shot 264. One output of one-shot 264 resets flip-flop 258, a second output of one-shot 264 resets flip-flop 212 through terminal T21, inhibiting AND gates 206 and 208, while a third output of one-shot 264 provides a strobe pulse to BCD to decimal converter 154. No output device is selected, however, since a (0000) zero command was loaded into stage 202 from typewriter 230.

The set output SO of flip-flop 258 changes to a false condition, inhibiting AND gate 260, but more importantly, triggering one-shot 262, an output of which pulses OR gate 248 to strobe a new address into registers 240, 242, and 244. A second output of one-shot 262 is applied to OR gate 184, which strobes a forward scan (1001) decimal 9 command into command decode 194 and gates a command channel select digit to binary to decimal converter 172. It is assumed that the next command will be taken from audio channel 0, therefore a (0010) decimal 2 command has been loaded into portions 198 and 200 of register 164.

For the purpose of explanation of operation, it is further assumed that a four-minute TV lecture will be presented to a student. It is readily seen that when the "go-to" command was completed, input 279 of AND gate 156 is now true and TV sound from NTSC audio channel P and video from video FM demodulator 118 is now fed to TV set 158. A new frame address in buffer register 240 is presented as one input to comparator 140 of address select 142. Frame numbers are fed from frame number detector 136 to buffer register 138 via terminal T4. Therefore, as the lecture is being presented, a search is conducted by comparator 140 for the next command word within four minutes.

This lecture began at frame number 25,000, word one. Since 1,800 frames per minute are being scanned by player 16, the next command word will be 1,800×4 (minutes), or 7,500 frames later, thus 25,000+7,500=frame number 32,500, and it is assumed that word four contains the next command. Therefore, the complete address is frame number 32,500, word four. This is (0011) decimal 3 in first word counter 242 and (0001) in last word counter 244. Once the selected frame number agrees with the present frame number, one output 284 of comparator 140 sets flip-flop 252 to initiate a word count as previously described, to select the desired word. Then an output of first word counter 242 sets flip-flop 212 via terminal T20, enabling AND gates 206 and 208 to copy the selected fourth word into command register 164, this time from audio channel P, as previously described. Upon the completion of the loading of a command into register 164, an output of last word counter 244 triggers one-shot 264, which resets flip-flops 212 and 258 and strobes an output device select digit into BCD to decimal converter 154. Further, the set output SO of flip-flop 212 of command select 116 strobes an output channel select digit into BCD to decimal converter 119 selecting audio channel 0. The set output of flip-flop 258 of address select 142 inhibits AND gate 260 and triggers one-shot 262. One output of one-shot 262 strobes another address into buffers 240, 242, and 244 while a second output of one-shot 262 pulses OR gate 184 of command/control logic 186. One output of OR gate 184 strobes another command digit into command decode 194, this time a forward scan-normal speed or decimal (6) command. Printer 152 is selected by BCD to decimal converter 154, and a question for the student is printed out by printer 152, as information to printer 152 flows from audio channel 0. The same question is presented by TV set 158 from video channel 290 and audio channel P. It is assumed that the question consists of 25 words which are copied by printer 152 during a 10-second interval.

The next frame number address then is 32,500+300 (for a 10-second presentation)=32,800 and at word number 1. Thus, when frame 32,800 appears in buffer register 138, an output 284 of comparator 140 again enables first word counter 242 which contains a zero (0000) command, and the first word is then copied into command register 164 as described above.

When last word counter 244 reaches a zero count, after one word, output 288 triggers one-shot 264. One-shot 264 resets flip-flops 258 and 212 as before. Flip-flop 212 inhibits data flow to register 164 while the set output of flip-flop 258 triggers one-shot 262 which strobes the next address into buffers 240, 242, and 244 and also triggers OR gate 164. The output of OR gate 184 strobes a "stop" command into command decode 194 and strobes a 3 (0011) channel select digit into BCD to decimal converter 172 of command channel select 116.

Still frame control 196 of player 16 is enabled by input 292 from command decode 194 via terminals T9 and T10, and TV set 158 shows one frame, 32,800 continually, which requests a student to enter an answer into register 268, as by typewriter 230, of input devices 214. A student thus types an answer consisting of six alpha-numeric characters which are entered and stored in response buffer 268 through AND gates 222 and 224 for later comparison with recorded answer portions in the following manner. As the final digit is entered, divide by 6 character counter 270 triggers OR gate 274, which in turn triggers OR gate 184, strobing a "go-to" command into command decode 194.

In a similar manner, as heretofore described, player 16 is directed to the next address, which is frame number 32,801, words 1-11. It is assumed that each word consists of an address and appropriate commands, and further that one word of the first 10 words includes a correct answer in answer portion 204 of register 164.

If the student has previously provided a correct answer in buffer 268, then as the sequentially recorded data group portions are serially transferred through command register 164, an answer portion 204 in register 164 matches the answer previously stored in buffer 268. This initiates an output of comparator 266 to OR gate 184, which stores the address on the recording medium of the desired second location on the recording medium containing the recorded information to be given to the student appropriate to that specific response and causes the playback of the recorded information at said second location. Because portions of the signal stored at that time in command register 164 include both the answer and the desired second location address, the machine described herein can accomplish this action without any other need to store response and branching address information other than that provided by command register 164. No large memory is required and no complex digital circuitry and digital program is required to control the loading and reading of such memory as is the case in other designs.

In the event that NO CORRECT ANSWER is given, the eleventh word is copied into command register 164, and an output 288 of last word counter 244 triggers one-shot 264 to initiate another cycle of events directing the video disc or video tape, for example, to a selected address of a multiplicity of possible addresses which were previously recorded on disc 10 appropriate to the lack of response.

What is claimed is:

1. The method of production and reproduction of a recording comprising the steps of:
   (A) recording on a recording medium a plurality of spaced segments wherein at least one of said segments includes a combination of video and audio signals, and generally co-located with said video and audio signals there is a series of sequentially recorded, digitally encoded, signals, and wherein said last-named signals comprise sets of two signals, a first signal representative of a selected response or answer, and a second signal designative of a separate and remote location on said recording medium;
   (B) reproducing at least video and audio signals from at least a part of one of said segments of said recording medium on a digitally controlled positionable playback device and then displaying a still frame of said segment;
   (C) generating a signal external to said recording medium, which signal is of the character of said first, response or answer, signal, and storing the generated signal;
   (D) utilizing the externally generated, stored signal to direct reproduction from selected locations on said recording medium, this time reproducing a series of said sets of said two signals;
   (E) during reproduction of step (D), comparing said externally generated signal with a series of said first response signals from said recording medium;
   (F) upon there occurring a selected correlation with a particular said first signal during step (E), obtaining, as an output, a said second location signal; and
   (G) controlling said playback device to locate and reproduce from a said segment of said recording medium identified by said second location signal identified by step (F).

2. The method as set forth in claim 1 wherein said selected correlation is the condition wherein the stored signal and a reproduced first signal are identical.

3. A post-response, interactive, information and playback system comprising:
   a video recording medium having at least one recorded track, said track having at least one video recorded channel and at least one, accompanying, aural recorded channel, and there being recorded in said video channel a plurality of video segments, and there being recorded in at least one of said channels, and proximate with at least one said video segments, a series of sequentially appearing, sets of digitally encoded signals, and wherein a said set comprises two signal portions, a signal A representative of an answer signal, and a signal L, representative of a related location signal;
   video medium reproduction means for supporting said video recording medium and including transducer means positionable adjacent to said video medium and a track of said medium for playing back from said track, thereby reproducing video and aural signals and said sets of digitally encoded signals, and responsive to applied signals for operatively positioning said transducer means with respect to discrete locations on said recording medium, including selected maintenance of a position of said transducer means with respect to a discrete portion of said recording medium whereby there is a repetitive playback from said track;
   position detection means responsive to the relative position between said transducer means and locations on said recording medium for providing location signals L' representative of discrete locations on said recording medium;
   digital generating means, separate from said recording medium, for generating a selected digital output A' representative of a proposed answer signal;
   processing means comprising:
      first circuit means, including a memory, for supplying a said applied signal to said positioning means of said video medium reproduction means for selectively positioning said transducer means with respect to a discrete portion of said recording medium for a discrete period and during said period being responsive to operation of said digital generating means for storing in said memory a discrete signal A' representative of a counterpart of a said signal A and thereby representative of a proposed answer signal,
      second circuit means responsive to said operation of said digital generating means, including first and second registers, and further responsive to said transducer means of said video medium reproduction means reproducing sequentially appearing signals A of said sets for causing signals A to sequentially appear in said first register and at the same time for causing a signal L of each set to sequentially appear in said second register, said appearances following the generation of said signal A' by said signal generating means, third circuit means, including a digital comparator, responsive to a said signal A' in said memory and said signals A sequentially appearing in said first register, for providing an output upon there occurring a selected comparability between signals A and A', and fourth circuit means coupled to said output of said third circuit means and being further coupled to said second register for providing, as a signal L output of said second register, a discrete location signal representative of a location on said recording medium;

control means responsive to said signal L from said fourth circuit means and a location signal L' from said position indicating means for providing said applied signal to said positioning means and selectively positioning said transducer means at a location indicated by said signal L from said fourth circuit means;

wherein, first, reproduction is effected from said recording medium;

second, said transducer means is positioned by said positioning means adjacent to a said portion of said recording medium, repetitively reproducing said portion;

third, a proposed answer signal A' is stored in said memory;

fourth, operation of said positioning means is effected, and said series of sets of digitally encoded said signals A and L are sequentially played back and said signals A sequentially compared with said signals A' and said location signal L of a said set is obtained, wherein said selected comparability of said signals A and A' is obtained;

and finally, said transducer means is operated for reproduction of a discrete said segment of said recording medium.

4. A post response, interactive, information and playback system as set forth in claim 3 wherein said transport means is a video disc transport means, and said recording is a video disc recording.

5. A post response, interactive, information and playback system as set forth in claim 3 wherein said digital comparator means includes means of providing as an output a said second portion of a word when there appears identity between a said first signal portion of a word and a said digital output of said digital generating means.

6. A system as set forth in claim 3 wherein there is recorded on said recording medium a further and last digitally encoded word of a said series, a digitally encoded word comprising at least a said signal L representative of a second location on said recording medium, and said digital comparator means comprises means responsive to a non-selected comparability with a said signal A of words of said series preceding said last word with a said signal A', for selecting as an output said signal L of said last word, whereby failure to make a positive selection with respect to any of said signals A preceding said last word results in the output of said digital comparator means being a discrete signal L of said last word.

7. A post response, interactive, information and playback system as set forth in claim 6 wherein said digital comparator means includes means of providing as an output said signal L portion of a word when there appears identity between said signal A of a word and said digital output signal A' from said digital generating means.

8. A post response, interactive, information and playback system as set forth in claim 7 wherein said portin of said video recording medium is a discrete said track, comprising a single circular length.

* * * * *